(12) United States Patent
Kulick

(10) Patent No.: US 11,050,271 B2
(45) Date of Patent: Jun. 29, 2021

(54) APPARATUSES AND METHODS FOR CHARGING ELECTRONIC DEVICES

(71) Applicant: Lorie L. Kulick, Crown Point, IN (US)

(72) Inventor: Lorie L. Kulick, Crown Point, IN (US)

(*) Notice: Subject to any disclaimer, the term of this patent is extended or adjusted under 35 U.S.C. 154(b) by 193 days.

(21) Appl. No.: 16/353,773

(22) Filed: Mar. 14, 2019

(65) Prior Publication Data

US 2019/0288529 A1 Sep. 19, 2019

Related U.S. Application Data

(60) Provisional application No. 62/642,657, filed on Mar. 14, 2018.

(51) Int. Cl.
*H02J 7/00* (2006.01)
*H02J 7/35* (2006.01)

(52) U.S. Cl.
CPC .......... *H02J 7/0027* (2013.01); *H02J 7/0042* (2013.01); *H02J 7/35* (2013.01); *H02J 7/00* (2013.01)

(58) Field of Classification Search
CPC .......... H02J 7/0027; H02J 7/0042; H02J 7/35; H02J 7/00; H02J 7/0044
See application file for complete search history.

(56) References Cited

U.S. PATENT DOCUMENTS

| 2015/0340892 A1* | 11/2015 | Schreiner | A47B 21/06 320/137 |
| 2017/0047751 A1* | 2/2017 | Fernandes | H02J 7/025 |
| 2019/0067982 A1* | 2/2019 | Cano | H02J 7/35 |

* cited by examiner

*Primary Examiner* — Michael C Zarroli
(74) *Attorney, Agent, or Firm* — Hartman Global IP Law; Gary M. Hartman; Domenica N. S. Hartman

(57) ABSTRACT

A charging apparatus for simultaneously charging multiple mobile devices. The apparatus includes a base having means for connecting the base to an electrical power source, at least one charging unit supported by the base and having at least one electrical port configured for supplying power to a mobile device, and a battery that draws power from the base and supplies power to the electrical port of the charging unit.

8 Claims, 8 Drawing Sheets

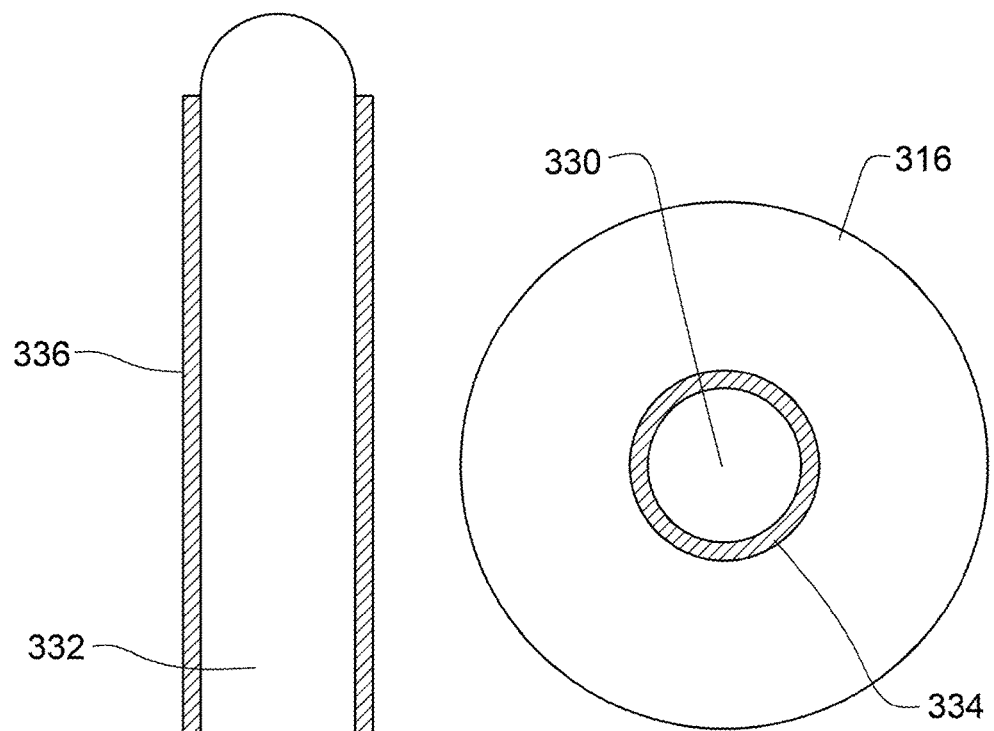
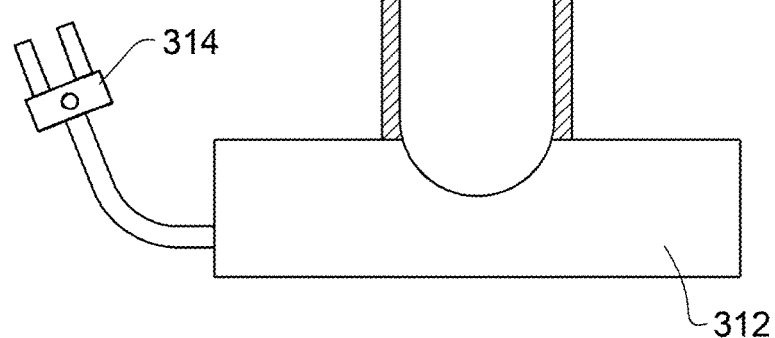

APPARATUSES AND METHODS FOR CHARGING ELECTRONIC DEVICES

CROSS REFERENCE TO RELATED APPLICATIONS

This application claims the benefit of U.S. Provisional Application No. 62/642,657, filed Mar. 14, 2018, the contents of which are incorporated herein by reference.

BACKGROUND OF THE INVENTION

The present invention generally relates to apparatuses and methods for charging electronic devices. The invention particularly relates to apparatuses that comprise one or more units that can be readily moved by an individual for charging personal electronic mobile devices, and to methods of using such an apparatus.

Personal electronic mobile devices, for example, cellular telephones, smart phones (the Apple iPhone®, the Samsung Galaxy®, etc.), smartwatches (e.g., the Apple Watch), satellite phones, tablets, personal digital assistants (PDAs), portable computers (laptops), etc., rely on battery power for their operation when not connected to an external power source. Individual mobile devices are commonly individually charged with a charger in the form of a dedicated AC adapter configured to plug into an electrical receptacle (AC outlet). AC adapters for mobile devices are typically equipped with a USB port into which a power cable of a mobile device can be plugged. AC adapters also exist that are equipped with multiple USB ports to enable simultaneous charging of multiple different mobile devices. Public areas, including airports, hotels, convention centers, etc., often provide USB ports for use by the public to charge mobile devices. However, public USB ports are usually very limited in number and location. Solar-powered chargers also exist for charging mobile devices.

In view of the above, it can be appreciated that there is an ongoing desire for systems that are capable of providing external power for recharging mobile devices.

BRIEF DESCRIPTION OF THE INVENTION

The present invention provides apparatuses suitable for charging personal electronic mobile devices, and particularly provides charging apparatuses that comprise one or more charging units that are portable to enable an individual to move a unit to a different location for the purpose of charging their mobile device. The present invention also provides methods of using such an apparatus to charge a mobile device.

According to one aspect of the invention, a charging apparatus for simultaneously charging multiple mobile devices includes a base having means for connecting the base to an electrical power source, at least one charging unit supported by the base and having at least one electrical port configured for supplying power to a mobile device, and a battery that draws power from the base and supplies power to the electrical port of the charging unit.

Technical aspects of charging apparatuses and methods described herein preferably include the ability to provide means for individuals to charge their mobile devices in a wide variety of public locations and settings, including but not limited to restaurants, hotels, airports, coliseums, stadiums, etc. Individual charging units of the apparatuses comprise an internal battery for providing battery power to charge one or more mobile devices, such that each unit is portable and not required to be connected to an AC outlet except to recharge its battery. The apparatuses and their units are preferably more durable and versatile than conventional chargers, and may offer such features as Bluetooth and/or WiFi connectivity and solar-powered charging.

Other aspects and advantages of this invention will be appreciated from the following detailed description.

BRIEF DESCRIPTION OF THE DRAWINGS

FIGS. 4A and 4B schematically represent, respectively, a side view of a base comprising a column and a top view of a stackable, ring-shaped charging unit for use with the base.

DETAILED DESCRIPTION OF THE INVENTION

The drawings schematically represent charging apparatuses equipped with electrical ports, preferably USB ports, into which one or more electronic devices can be plugged into for charging. The USB ports are preferably type-A receptacles, but may be type-B receptacles, micro-B receptacles, UC-E6 receptacles, mini-B receptacles, as well as any other type of connection standard existing now or developed in the future that is capable of transmitting electrical power from an electrical power source to an electronic device. The following discussion will particularly focus on the charging of personal electronic mobile devices (hereinafter, mobile devices), including but not limited to cellular telephones, smart phones (the Apple iPhone®, the Samsung Galaxy®, etc.), smartwatches, satellite phones, tablets, personal digital assistants (PDAs), portable computers (laptops), etc., personal computers, and peripheral devices, though the charging of other types of electronic devices is also within the scope of the invention.

The charging apparatuses provide means by which individuals are able to charge their mobile devices in a wide variety of public locations and settings, including but not limited to restaurants, hotels, airports, concert venues, stadiums, etc. The charging apparatuses comprise one or more individual charging units, each equipped with at least one internal battery for providing electrical power capable of charging one or more mobile devices plugged into the charging unit. The units are not required to be connected to an AC outlet or other suitable electrical power source except when desired or necessary to recharge their batteries. According to a preferred aspect of the invention, the charging units are individually portable, allowing individuals to relocate individual units to a location that is more convenient or private for the user to charge their mobile device while the device is being charged by the unit.

Figure 1:
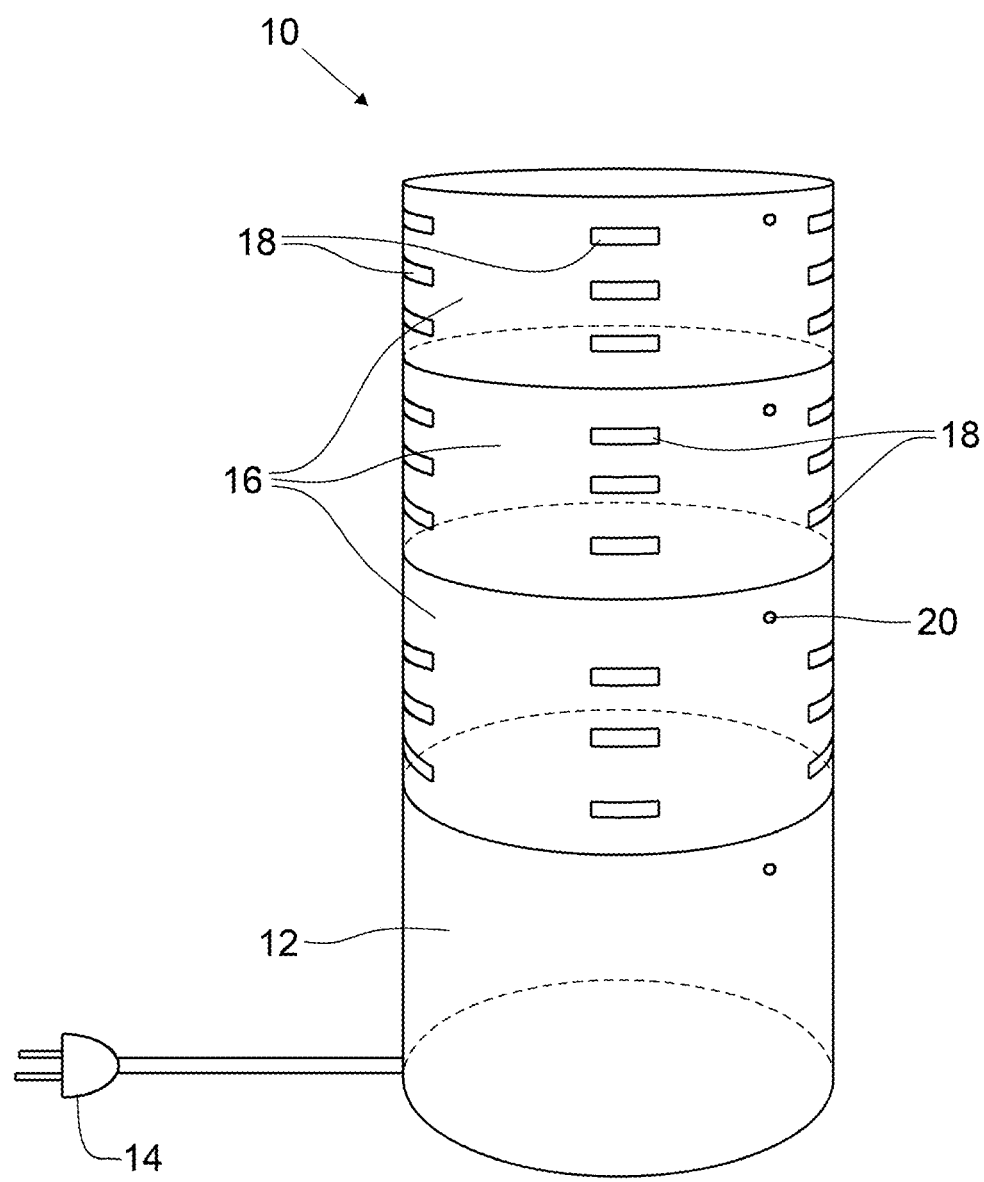
FIG. 1 schematically represents a first embodiment of a charging apparatus comprising a stack of charging units in accordance with certain nonlimiting aspects of this invention.

FIG. 1 represents a charging apparatus 10 according to a first nonlimiting embodiment of the invention. The apparatus 10 is shown in FIG. 1 as comprising a base 12 equipped with an AC plug 14 for supplying power (e.g., 110 V) to the base 12, and a series of individual charging units 16, configured as rings or disks, that are stacked on and supported by the base 12. Though an AC plug 14 is depicted, the apparatus 10 may be adapted to obtain power from various sources, for example, a plug adapted to obtain power from a DC power source (such as 6V and 12V batteries commonly available through outlets in boats and motor vehicles), as well as evolving technologies such as Bluetooth and other wireless technologies. The units 16, sometimes referred to herein as "Power Rings," are stacked in series on the base 12, such that except for the lowest unit 16 in the series, each unit 16 is stacked on and supported by another unit 16 of the stack. Each unit 16 contains an internal rechargeable battery (not shown). While stacked, the units 16 are all electrically connected to the base 12 to receive electrical power from the base 12 to charge their respective batteries. If configured as rings, the charging units 16 may slide onto an upright central column (not shown) that projects upward from the base 12, such that the rings are removable and portable components of the apparatus 10. According to one approach, the units 16 are individually charged in parallel through an electromagnetic field or other wireless charging means capable of being generated by the column of the base 12. Alternatively or in addition, the units 16 may be individually charged in series through a series of physical electrical connections between each adjacent pair of units 16 in the stack. For example, each unit 16 may be equipped with male and female connectors, so that each unit 16 that is stacked on and supported by an adjacent lower unit 16 can be electrically connected to that lower unit 16 to receive electrical power from the base 12 through the lower unit 16 as well as any other units 16 in the stack that support the unit 16. In such an embodiment, the column may be omitted, in which case the charging units 16 may be disk-shaped instead of ring-shaped.

Each unit 16 has at least one and preferably multiple electrical ports 18 (e.g., USB) to which a mobile device can be connected for drawing power from the unit's battery. The ports 18 are represented as spaced around the perimeter of each unit 16, though ports 18 could also or instead be located in the upper and/or lower surface of each unit 16. Alternatively or in addition, each unit 16 may be equipped with docks or slots (for example, in its upper surface) configured to support a mobile device while it is being charged by the unit 16. FIG. 1 represents each unit 16 as having an indicator light 20 to notify users of the charge status of the unit 16, for example, a continuous light if the unit 16 is charged and a blinking light if the unit 16 drops below a charge threshold.

The apparatus 10 of FIG. 1 is particularly well suited for use in public settings in which tables are available where charging units 16 can be placed by individuals, for example, a table at a restaurant for use by one or more individuals sitting at a table. In this example, the apparatus 10 shown in FIG. 1 can be placed in any convenient location within the restaurant, and patrons of the restaurant can remove individual charging units 16 from the apparatus 10 and place them on tables for use by individuals sitting at the tables. While the battery of a unit 16 still has power, the patrons are able to charge their mobile devices without the need for access to an AC outlet. However, each unit 16 is preferably equipped with electronics capable of detecting its proximity to the apparatus 10, so that if the unit 16 is taken beyond a certain perimeter from its base 12, an internal indicator alarm or buzzer can or will be activated. As another theft deterrent, the units 16 are preferably unable to be recharged without connection to their base 12. The apparatus 10 of FIG. 1 can also be used in other settings, for example, airports, hotels, concert venues, etc.

The apparatus 10 of FIG. 1 is represented as having three individual charging units 16, though apparatuses within the scope of the invention may have fewer or more units. The charging units 16 may have various charge capacities, as a nonlimiting example, four to ten hours of useful charge, depending on the type and number of mobile devices drawing power from the units 16.

FIGS. 2A through 8 depict additional apparatuses in accordance with further nonlimiting embodiments of this invention. In these figures, consistent reference numbers are used to identify the same or functionally related/equivalent elements, but with a numerical prefix (1, 2, or 3, etc.) added to distinguish the particular embodiment from other embodiments of the invention. In view of similarities between the embodiments, the following discussions of FIGS. 2A through 8 will focus primarily on aspects of the further embodiments that differ from the first embodiment (FIG. 1) in some notable or significant manner. Other aspects of the further embodiments not discussed in any detail can be, in terms of structure, function, materials, etc., essentially as was described for the first embodiment.

Figure 2A:
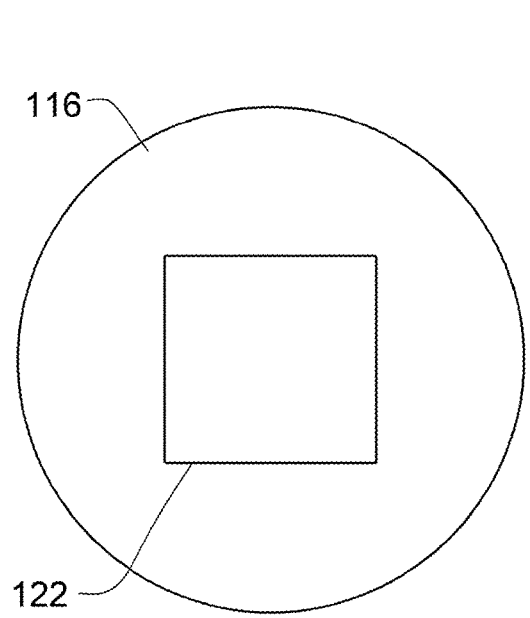
FIGS. 2A and 2B schematically represent top and bottom views, respectively, of a stackable, disk-shaped charging unit configured for use with a base that lacks a central column and comprising a locking system in accordance with certain nonlimiting aspects of this invention.
Figure 2B:
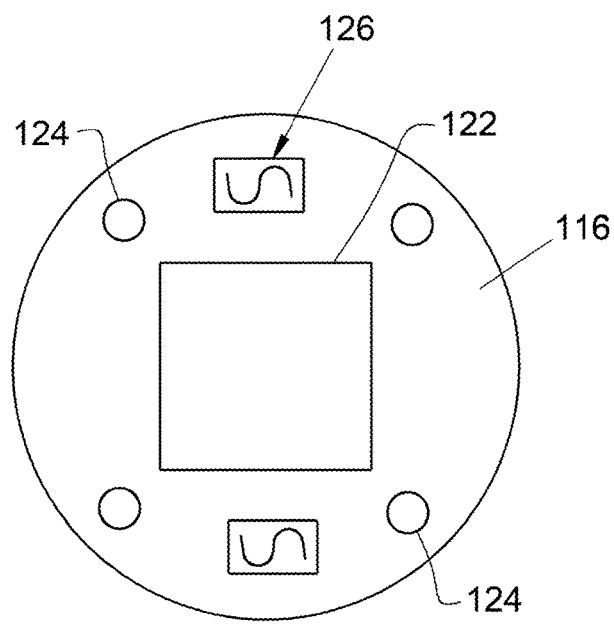

FIGS. 2A and 2B schematically represent top and bottom views, respectively, of an individual charging unit 116 that is stackable and cylindrical (disk-shaped) in appearance instead of ring-shaped, and therefore configured to be stacked on a base that can be the same as the base 12 of FIG. 1. Similar to the units 16 of FIG. 1, the unit 116 has an internal rechargeable battery (not shown) for charging mobile devices, for example, through ports (not shown), as described for FIG. 1. In the embodiment of FIGS. 2A and 2B, charging of the internal battery of each charging unit 116 is through wireless induction between the base and units 116, for example, with inductive charging surfaces 122 on the base and on each unit 116 such that charging power is transferred through the stack of units 122 as a result of power transfer between the base and the first unit 116 directly on the base and thereafter between adjacent individual units 116 stacked on the first unit 116. The charging surfaces 122 may be formed of glass plates or another suitable material that allows inductive charging between the base and units 116. The charging surfaces 122 may also be adapted to wirelessly (inductively) charge a mobile device placed thereon (e.g., after the unit 116 has been removed from the base, in which case the charging surface 122 draws power from the internal battery to charge the mobile device. In FIG. 2B, "feet" 124 formed of a felt-like material (or functionally equivalent material) are located on the bottom of each charging unit 116 to help protect the unit 116 from sliding. FIG. 2B also represents an optional inter-unit locking system 126 located on the lower surface of each charging unit 116, such that each unit 116 can be secured to a table or other suitable surface equipped with a complementary locking feature.

Figure 3A:
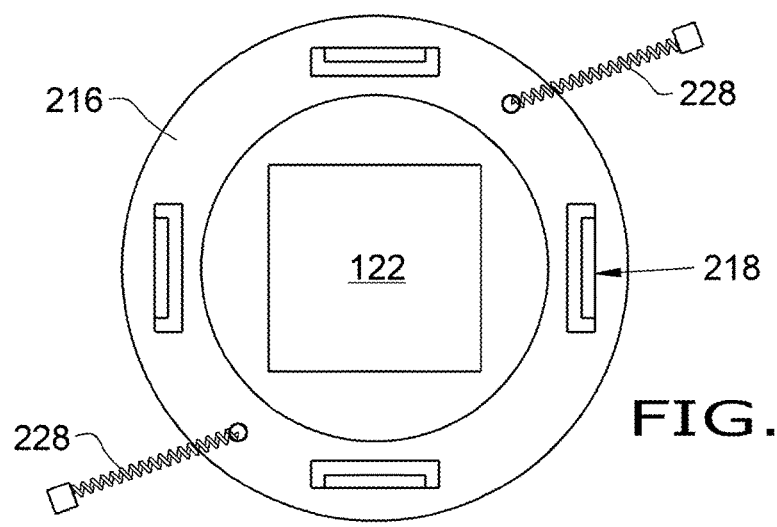
FIGS. 3A and 3B schematically represent top and side views, respectively, of a stackable, disk-shaped charging unit configured for use with a base that lacks a central column and comprising retractable charging cords in accordance with certain nonlimiting aspects of this invention.
Figure 3B:
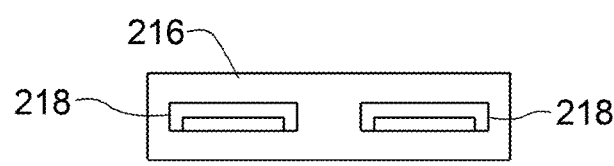

FIGS. 3A and 3B schematically represent top and side views, respectively, of a charging unit 216 that is also stackable and cylindrical (disk-shaped) in appearance, and therefore configured for use with a base that lacks a central column. In this embodiment, electrical ports 218 (e.g., USB) or mobile device docks are located on the top surface of the charging unit 216, and electrical ports 218 are also located on the sides of the unit 216. In addition, the unit 216 has two mobile auxiliary retractable 2-in-1 charging cords 228 that are internally connected to the power source (battery) within the unit 216 and are configured for connection to existing mobile devices, such as but not limited to Apple and/or Samsung devices, and potentially other rechargeable devices developed in the future.

FIGS. 4A and 4B schematically represent, respectively, a side view of a base 312 and a top view of one of multiple ring-shaped charging units 316 for use with the base 312 of FIG. 4A. The unit 316 is ring-shaped as a result of having a central opening 330. The base 312 has an upright central column 332 configured as a conduction rod for transmitting electrical power to the batteries of the charging units 316, whose central openings 330 enable each unit 316 to be slid over and received on the central column 332 of the base 312. The central openings 330 of the stackable ring-shaped charging units 316 have an inner metal conductive wall 334 to receive power from a complementary conductive wall 336 on the column 332. The outer diameter of the column 332 approximates the inner diameter of each charging unit 316 to promote the ability for conduction to occur.

Figure 5A:
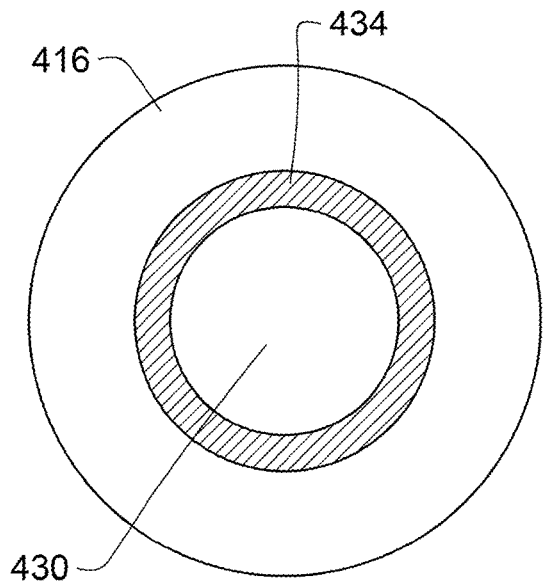
FIGS. 5A, 5B, and 5C schematically represent, respectively, top, bottom, and side views of a ring-shaped charging unit 416 configured for use with a base equipped with a central column.
Figure 5B:
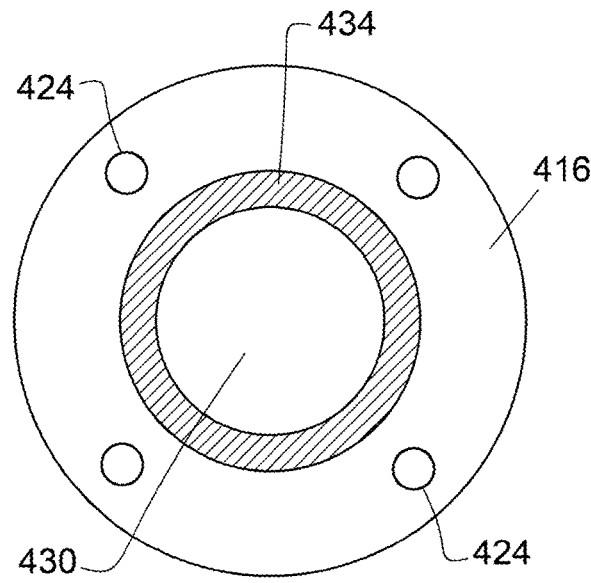
Figure 5C:
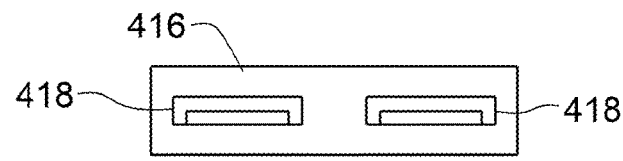

FIGS. 5A, 5B, and 5C schematically represent, respectively, top, bottom, and side views of a ring-shaped charging unit 416 configured for use with a base equipped with a central column, such as the base 312 shown in FIG. 4A. As with previous embodiments of ring-shaped charging units 216, the central opening 430 of the charging unit 416 enables the unit 416 to be slid over the central column of a base and the outer diameter of the column approximates the inner diameter of the charging unit 416. In this embodiment, the inner wall of the central opening 430 of the charging unit 416 has a metal conductor 434 for receiving power from the column by induction. Pads 424 are provided on the lower surface of the charging unit 416 to provide physical separation between the lower surface of the unit 416 and an upper surface of a second unit 416 on which the unit 416 is placed in a stack on a base. The pads 424 preferably prevent or reduce heat transfer between the units 416. The charging unit 416 of FIGS. 5A, 5B, and 5C may be further equipped with one or more features described for the embodiments of FIGS. 1 through 4.

Figure 6A:
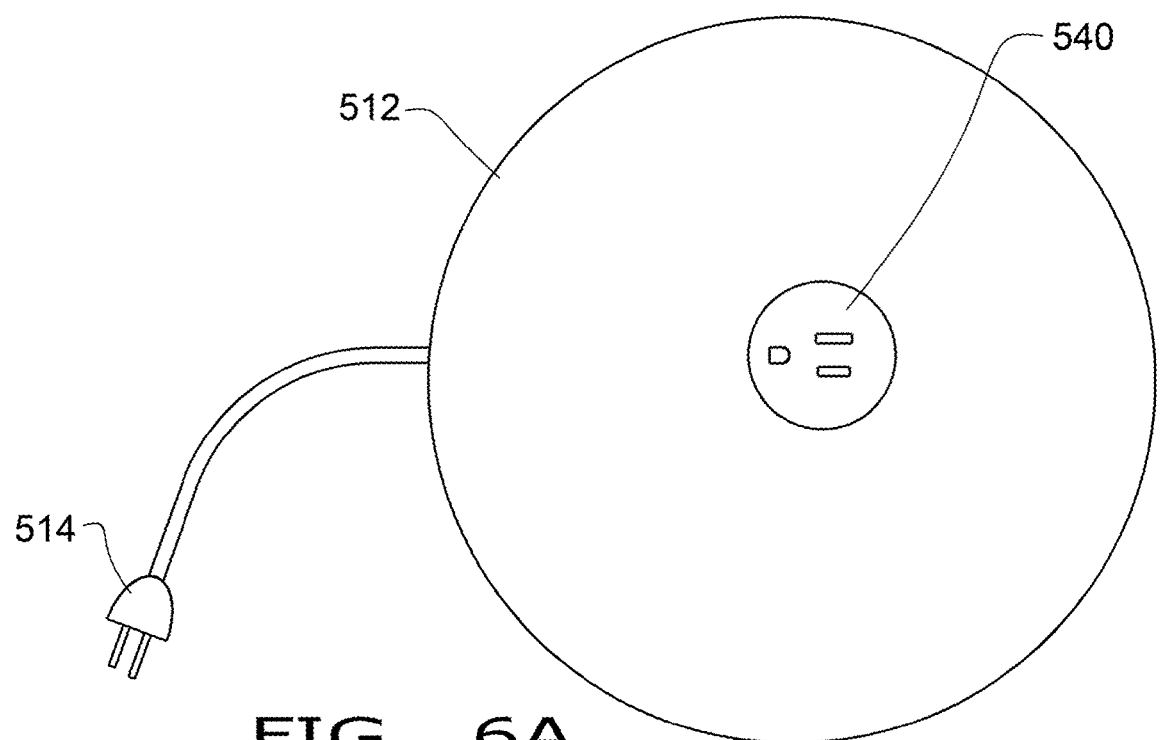
FIGS. 6A and 6B schematically represent, respectively, a top view of a base that lacks a central column, and a bottom view of a stackable, disk-shaped charging unit comprising a male electrical plug configured to mate with a female electrical socket of the base when stacked thereon.
Figure 6B:
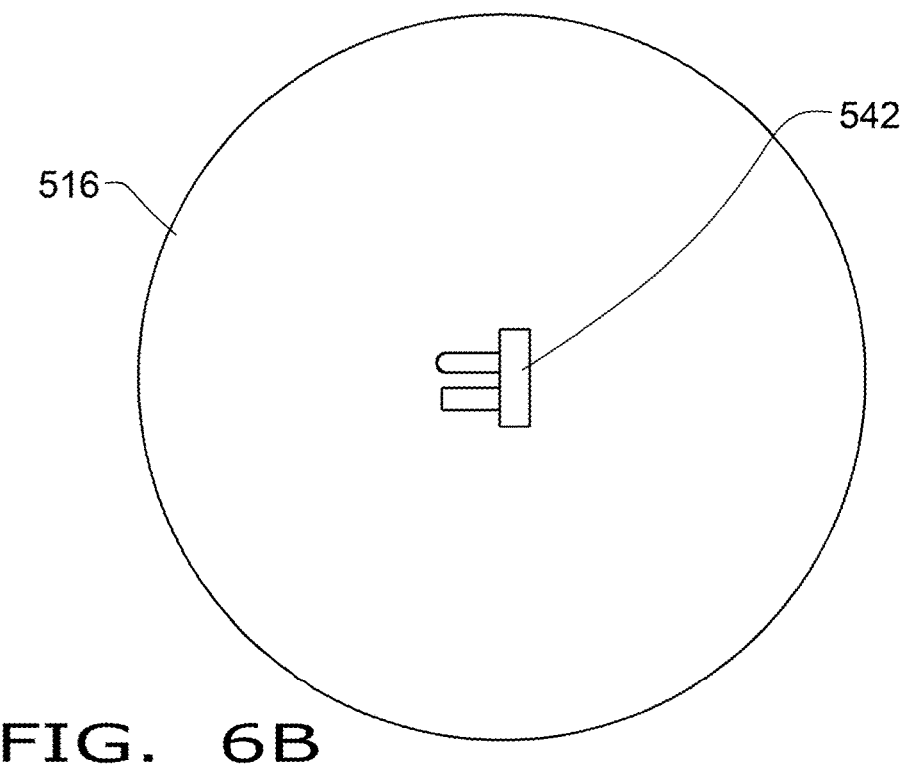

FIGS. 6A and 6B schematically represent, respectively, a top view of a base 512 that lacks a central column, and a bottom view of a charging unit 516 that is disk-shaped instead of ring-shaped. In this embodiment, charging of the charging unit 516 is through male/female electrical plugs 540 and 542 located on the mating surfaces of the base 512 and each charging unit 516 used with the base 512. In the nonlimiting embodiment shown, the top surface of the base 512 and the top surfaces of each charging unit 516 each have a female plug 540 for connecting to a male retractable plug 542 on the bottom of each unit 516. The base 512 is equipped with a retractable power cord 514 for drawing AC power from an electrical source to charge the batteries (not shown), though, as with previous embodiments, power from various other sources is foreseeable.

Figure 7A:
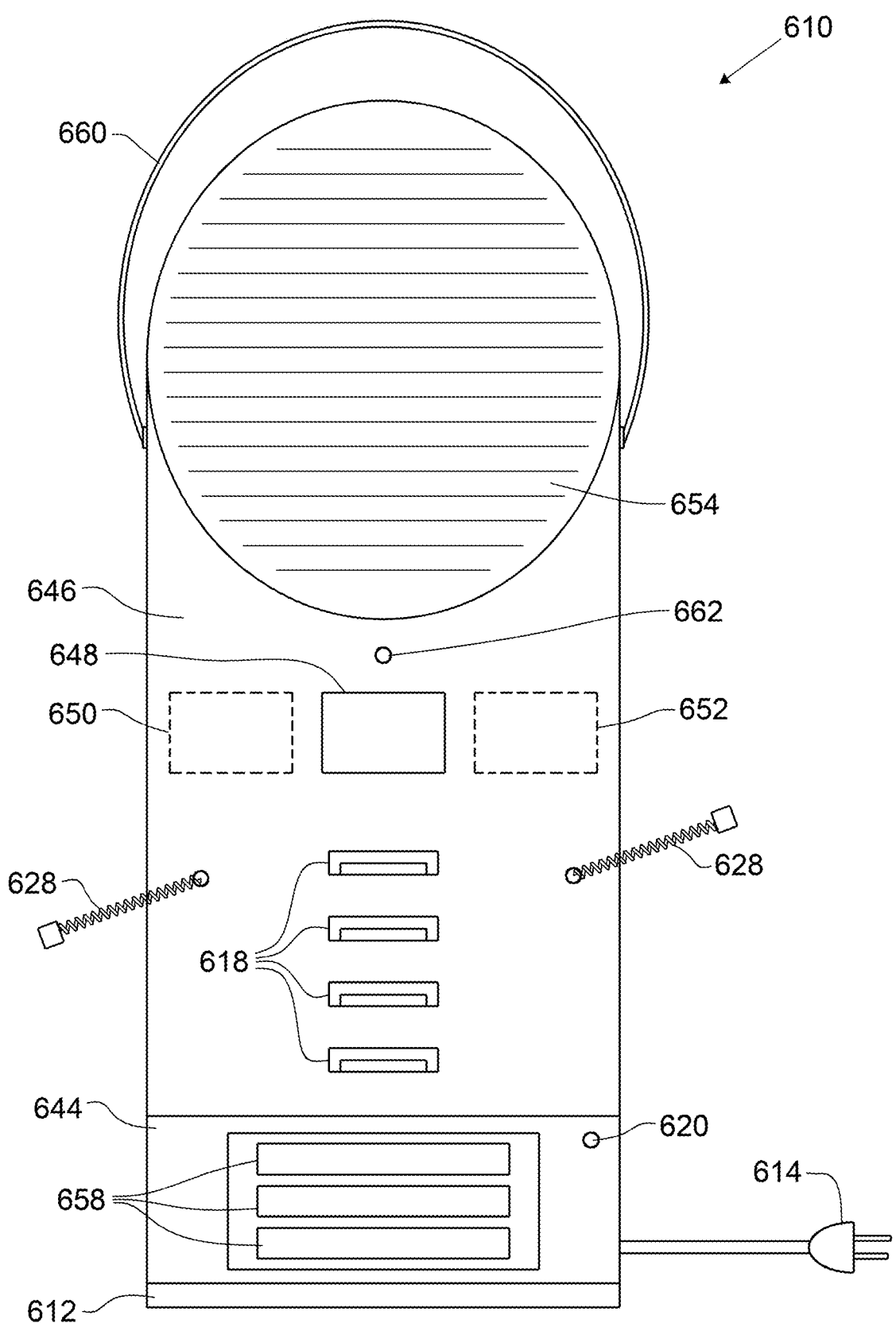
FIG. 7A schematically represents a side view of a charging apparatus having a base and a removable portable tower that sits on the base. The tower is configured to provide power from batteries located in the base and/or from a solar panel on the tower.

FIG. 7A schematically represents a side view of a charging apparatus 610 particularly well suited for retail purchase for private and commercial use, e.g., hotels, etc. The apparatus 610 has a base 612 with a compartment 644 for housing rechargeable batteries 658 and a removable and portable tower 646 that sits on the base 612. The portable tower 646, which serves as a single charging unit of the apparatus 610, is equipped with multiple electrical ports 618 (e.g., USBs), and is also represented as having a speaker 648 and components 650 and 652 configured to provided Bluetooth and WiFi capabilities, respectively. The base 612 is equipped with a retractable power cord 614 for drawing AC power from an electrical source to charge the batteries 658 (though, as with previous described embodiments, power from various other sources is foreseeable).

Figure 7B:
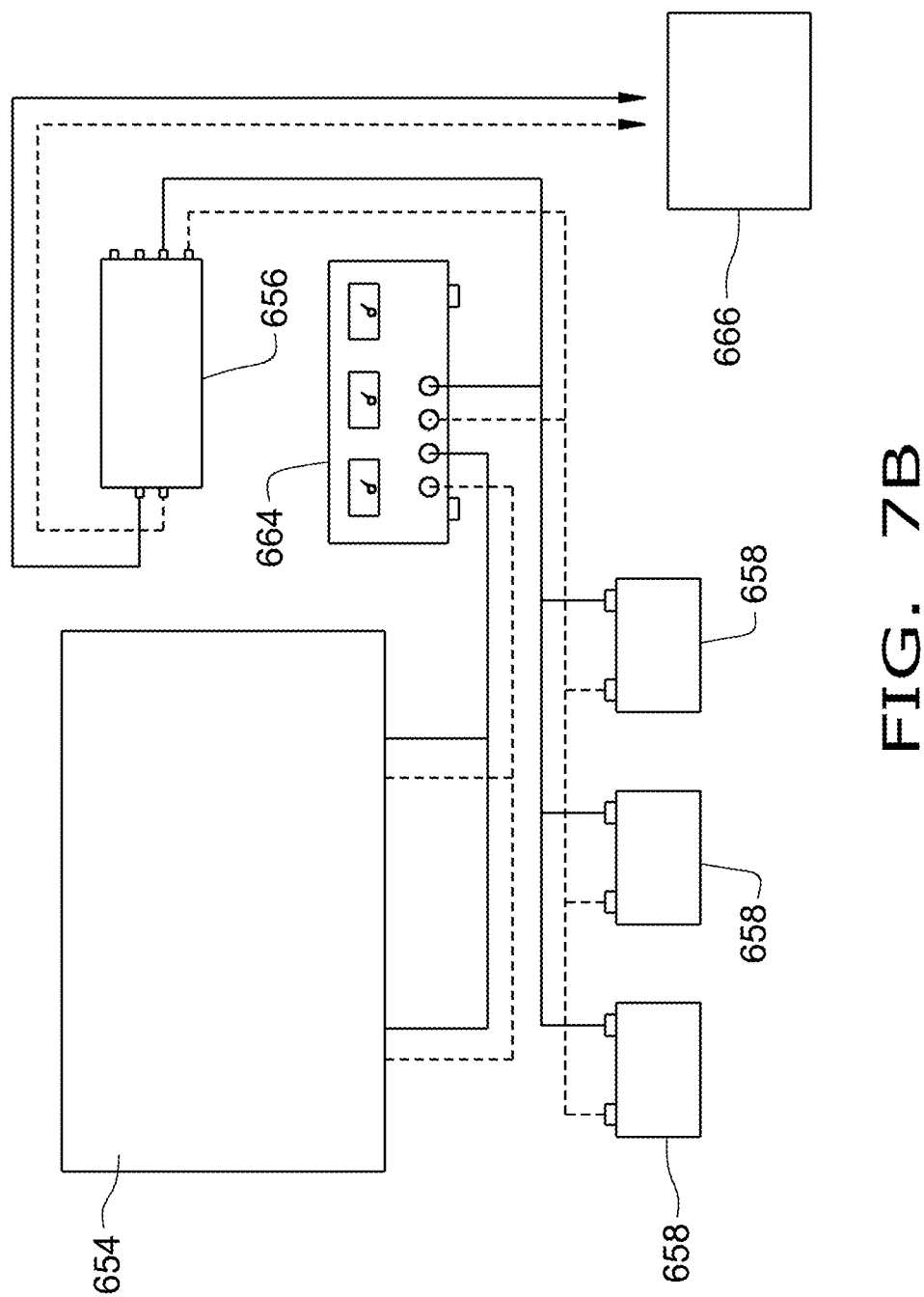
FIG. 7B schematically represents electrical connections between the batteries and solar panel of FIG. 7A and an external rechargeable device.

The portable tower 646 draws power from the batteries 658 in the base 612, but when removed from the base 612 can also be powered by a solar panel 654 at its upper end that generates electrical power via an inverter 656, for example, as schematically represented in FIG. 7B. The nonlimiting embodiment of FIG. 7B represents the solar panel 654 connected to the batteries 658 through a charge controller 664, and to a rechargeable device 666 through the charge controller 664 and inverter 656.

An indicator light 620 on the base 612 indicates the charge state of the batteries 658. For example, a steady light may indicate that the batteries 658 are fully charged, and a blinking light may indicate that the batteries 658 need to be recharged. Other optional features of the charging apparatus 610 of FIG. 7A include a waterproof coating, a base 612 that floats, and a foldable handle 660 for portability.

The Bluetooth capability provides for connectivity with cellular devices, and the WiFi capability provides the ability to connect to a public WiFi or allow the apparatus 610 to serve as a WiFi source. The tower 646 can be equipped with an auxiliary jack 662 (or other port capable of connecting to an external audio device) in addition or as an alternative to the speaker 648 to allow for connection to headphones or additional speakers. The apparatus 610 is also shown to have two mobile auxiliary retractable 2-in-1 charging cords 628 for connection to mobile devices, such as but not limited to Apple and/or Samsung devices, and potentially other rechargeable devices developed in the future.

Figure 8:
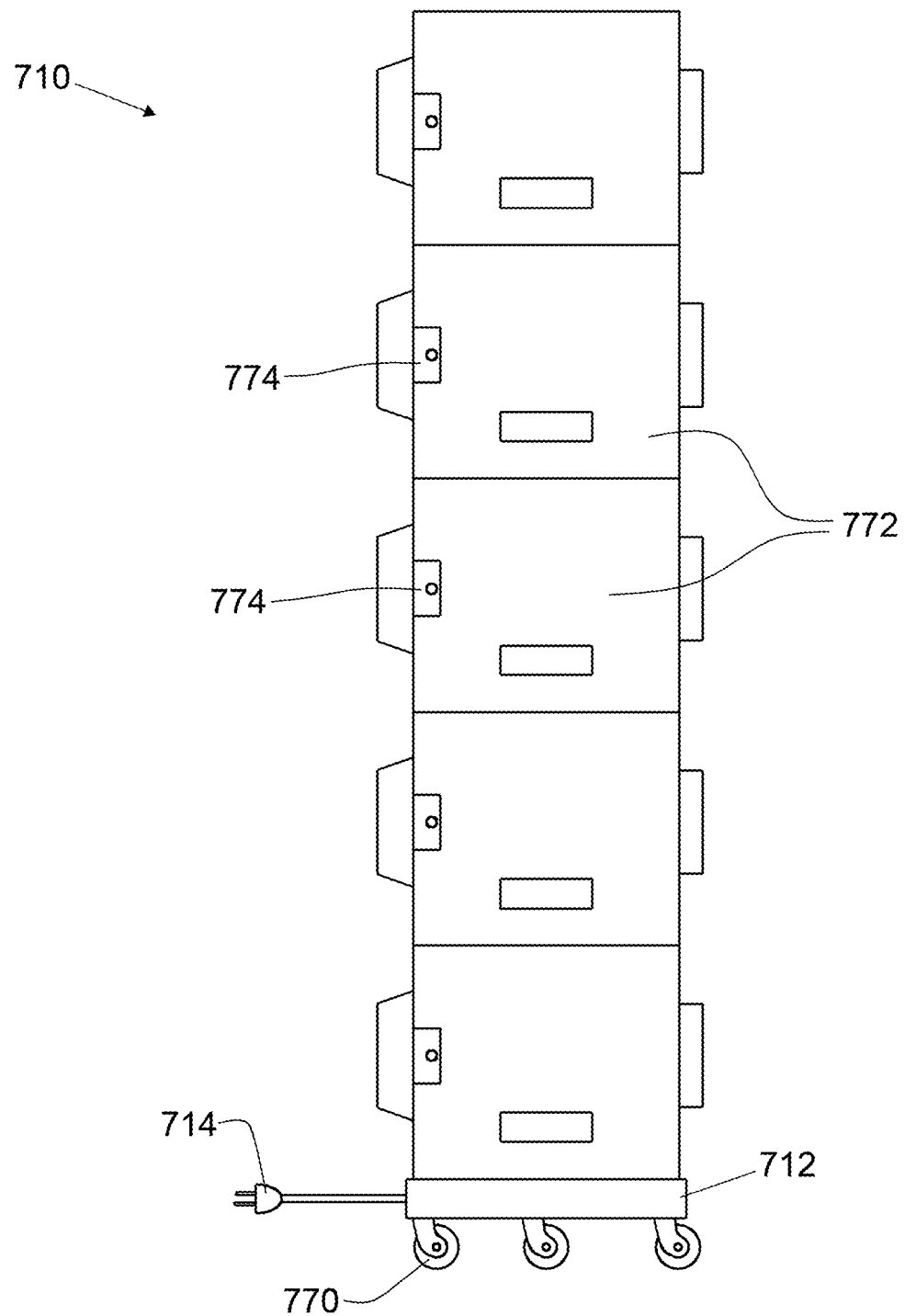
FIG. 8 schematically represents a side view of a charging apparatus having a base on which multiple lockable storage units are stacked. The units include compartments having charging units therein.

FIG. 8 schematically represents a side view of a charging apparatus 710 having a base 712 on which multiple charging units are stacked. The apparatus 710 is a mobile unit mounted on wheels 770 for moving the apparatus 710 to different locations within public settings or venues, e.g., airports, airport gates, convention centers, malls, movie theaters, coliseums, and/or sporting events. The apparatus 710 may be further equipped with wheel locks or other stabilization device to prevent or inhibit movement of the apparatus 710 once positioned at a desired location. The apparatus 710 has a power cord 714 that allows it to be plugged into a 110/220 volt AC power source to provide a "rapid charge" capability. The apparatus 710 has two or more private storage units 772 (e.g., five as shown), preferably fireproof, that are stacked one on top of the other.

Each storage unit 772 may contain one or more storage compartments (not shown), each serving as or having therein a charging unit equipped with one or more electrical ports (not shown) such that at least one mobile device can be stored in each compartment while it is being charged. The electrical ports can be provided on a ring or disk as described in reference to prior embodiments, but permanently attached to the interior of each compartment to prevent removal from the compartment. If the charging units include batteries as described in reference to some of the prior embodiments, the batteries may be charged via the base 712 and any other storage compartments 772 stacked therebetween.

The storage units 772 may be numbered and equipped with locking doors 774 that can be opened, for example, by paying a fee per usage. The base 712 may have a locking system to prevent movement of the apparatus 710. The storage units 772 may be permanently fixed to one another in the stack, or may be releasably locked to one another and the base 712. Similar to the apparatus of FIGS. 7A and 7B, the apparatus 710 of FIG. 8 may have the capability of WiFi access.

While the invention has been described in terms of particular embodiments, it should be apparent that alternatives could be adopted by one skilled in the art. For example, the apparatuses, and their components could differ in appearance and construction from the embodiments described herein and shown in the drawings, functions of certain components of the apparatuses could be performed by components of different construction but capable of a similar (though not necessarily equivalent) function, and various materials could be used in the fabrication of the apparatuses and/or their components. In addition, the invention encompasses additional or alternative embodiments in which one or more features or aspects of different disclosed embodiments may be combined. Accordingly, it should be understood that the invention is not necessarily limited to any embodiment described herein or illustrated in the drawings. It should also be understood that the phraseology and terminology employed above are for the purpose of describing the illustrated embodiments, and do not necessarily serve as limitations to the scope of the invention. Therefore, the scope of the invention is to be limited only by the following claims.

The invention claimed is:

1. A charging apparatus for simultaneously charging multiple mobile devices, the apparatus comprising:
    a base having an upper surface and means for connecting the base to an electrical power source;
    at least first and second charging units that are individually portable, the first and second charging units being supported by the base and removably stacked in series one on top of the other on the upper surface of the base so that the first charging unit is directly supported by and contacts the upper surface of the base and the second charging unit is directly supported by and contacts the first charging unit, the first and second charging units each being electrically coupled to draw electrical power from the electrical power source through the base, each of the first and second charging units having a battery that stores the electrical power respectively drawn thereby, each of the first and second charging units having at least one electrical port electrically coupled to the battery thereof and configured for supplying the electrical power stored in the battery thereof to a mobile device; and
    wherein the second charging unit and then the first charging unit are removable in series from the base and are thereby electrically uncoupled from the electrical power source and the base for use as individually portable charging units.

2. The charging apparatus according to claim 1, wherein the base has a column and each of the first and second charging units is ring-shaped and has a central opening sized to enable the charging unit to slide onto the column.

3. The charging apparatus according to claim 1, wherein the second charging unit is electrically coupled to the first charging unit to draw the electrical power from the electrical power source through the base and then through the first the charging unit.

4. The charging apparatus according to claim 1, wherein the battery of each of the first and second charging units wirelessly draws the electrical power directly from the base.

5. The charging apparatus according to claim 1, wherein the battery of each of the first and second charging units draws the electrical power directly from the base through a physical electrical connection to the base.

6. The charging apparatus according to claim 1, further comprising means for locking the first and second charging units to the base.

7. The charging apparatus according to claim 1, wherein the electrical port of each of the first and second charging units is a USB port.

8. The charging apparatus according to claim 1, wherein each of the first and second charging units detect proximity thereof to the base.

* * * * *